United States Patent
Engelhardt (10) Patent No.: US 11,312,317 B2
(45) Date of Patent: Apr. 26, 2022

(54) VEHICLE HEADLINER SYSTEM AND METHOD FOR INSTALLING THE SAME

(71) Applicant: Continental Structural Plastics, Inc., Auburn Hills, MI (US)

(72) Inventor: Thomas A. Engelhardt, Auburn Hills, MI (US)

(73) Assignee: TEIJIN AUTOMOTIVE TECHNOLOGIES, INC., Auburn Hills, MI (US)

( * ) Notice: Subject to any disclaimer, the term of this patent is extended or adjusted under 35 U.S.C. 154(b) by 0 days.

(21) Appl. No.: 16/862,654

(22) Filed: Apr. 30, 2020

(65) Prior Publication Data

US 2020/0377039 A1 Dec. 3, 2020

Related U.S. Application Data

(60) Provisional application No. 62/856,188, filed on Jun. 3, 2019.

(51) Int. Cl.
*B60R 13/02* (2006.01)

(52) U.S. Cl.
CPC ...... *B60R 13/0225* (2013.01); *B60R 13/0206* (2013.01); *B60R 2013/0287* (2013.01)

(58) Field of Classification Search
CPC ............ B60R 13/0225; B60R 13/0206; B60R 13/0212; B60R 13/0815; B60R 13/01; B60R 2013/0287; B60R 2013/0807; B60R 21/214; Y10T 24/309; Y10T 24/44026; Y10T 24/30; Y10T 24/45775; F16B 21/086

(Continued)

(56) References Cited

U.S. PATENT DOCUMENTS 4,420,859 A * 12/1983 Hammerle ............... F16B 21/06
                                                        24/595.1
5,797,643 A * 8/1998 Demedash ............... B60J 7/104
                                                        160/368.1

(Continued)

FOREIGN PATENT DOCUMENTS

JP    2008012957 A    1/2008
JP    2016074252 A    5/2016

OTHER PUBLICATIONS

Int'l Search Report for PCT/US2020/035502, dated Sep. 11, 2020.

*Primary Examiner* — Dennis H Redder
*Assistant Examiner* — Joyce Eileen Hill
(74) *Attorney, Agent, or Firm* — Blue Filament Law PLLC (57) ABSTRACT

A headliner for use in a vehicle having a roof, the headliner including a sheet and a plurality of first snap portions adapted to couple with a plurality of corresponding second snap portions fixed to the vehicle roof to mount the sheet to an interior side the vehicle roof through the interaction of the plurality of first snap portions and the corresponding second snap portions. A method for installing a headliner on a vehicle roof structure includes providing a headliner comprising a sheet having an upper surface, a lower surface, and a plurality of first snap portions fixed to the sheet, and joining the plurality of first snap portions to a plurality of second snap portions fixed to the roof structure, the plurality of second snap portions adapted to couple with the plurality of first snap portions to mount the sheet to the interior side the vehicle roof structure.

17 Claims, 7 Drawing Sheets

(58) Field of Classification Search
USPC .......... 296/214; 411/508; 24/458, 305, 662, 24/664; 160/68.1
See application file for complete search history.

(56) References Cited

U.S. PATENT DOCUMENTS

| | | | |
|---|---|---|---|
| 5,933,929 A * | 8/1999 | Kawakami | A44B 17/0035 |
| | | | 24/681 |
| 6,003,928 A * | 12/1999 | Curtindale | B60N 3/026 |
| | | | 296/214 |
| 6,475,937 B1 * | 11/2002 | Preisler | B60R 13/0225 |
| | | | 280/751 |
| 7,001,128 B2 | 2/2006 | Kuntze | |
| 8,403,356 B2 | 3/2013 | Tago et al. | |
| 9,179,743 B2 * | 11/2015 | Momose | A44B 17/0029 |
| 9,527,372 B2 | 12/2016 | Suesada et al. | |
| 10,130,148 B1 * | 11/2018 | Au | A44B 17/007 |
| 2004/0258471 A1 * | 12/2004 | Granata | F16B 5/126 |
| | | | 403/381 |
| 2011/0114414 A1 * | 5/2011 | Bliton | G10K 11/165 |
| | | | 181/286 |
| 2012/0001457 A1 * | 1/2012 | VanHouten | H05K 3/12 |
| | | | 296/214 |
| 2013/0285419 A1 * | 10/2013 | Lizak | B60R 13/0212 |
| | | | 296/214 |
| 2017/0129421 A1 * | 5/2017 | Dickinson | B60R 13/0206 |
| 2017/0184348 A1 | 6/2017 | Wu | |
| 2017/0246995 A1 * | 8/2017 | Sanchez Cruz | B60R 13/0225 |
| 2018/0056912 A1 * | 3/2018 | Zaldivar Ortiz | B60R 21/04 |
| 2018/0211752 A1 * | 7/2018 | Villacres Mesias | H01F 7/06 |

\* cited by examiner

VEHICLE HEADLINER SYSTEM AND METHOD FOR INSTALLING THE SAME

RELATED APPLICATIONS

This application claims priority benefit of U.S. Provisional Application Ser. No. 62/856,188 filed on Jun. 3, 2019, the contents of which are hereby incorporated by reference.

FIELD OF THE INVENTION

The present invention in general relates to a vehicle headliner and a vehicle headliner system for attachment to a roof structure of a vehicle, and in particular to a vehicle headliner and headliner system that utilizes mechanical snap fasteners to secure the headliner to a roof structure of a vehicle.

BACKGROUND OF THE INVENTION

As is well known in the art, it is desirable to provide an attractive and durable interior headliner for use in covering the underside of a vehicle roof. Headliners separate the passenger compartment from the roof structure of the vehicle. Vehicle headliners provide a decorative panel that makes the vehicle roof structure more attractive when viewed from within the passenger compartment and absorb sounds from within the passenger compartment as well as sounds originating outside the passenger compartment. It is important, of course, that such headliners be of low cost and be relatively simple to manufacture and convenient to install.

Headliners are typically constructed of suitable soft fibrous, woven, knitted, or supported vinyl fabric secured to the upper edges of the roof structure in a manner such that the fabric can be tensioned to conform with the general contour of the roof. Headliners may also be constructed of a relatively rigid molded or formed construction that conforms with the general contour of the roof.

In some instances, a headliner is secured to a roof structure using adhesives or push pins to bond the headliner directly to the underside of the roof structure or to secure corresponding halves of hook and loop fasteners to the headliner and roof structure to then attach the headliner to the roof structure using the hook and loop fasteners. Trim panels may be used to further secure the headliner to the roof structure and hide the edges of the headliner. Over time, such adhesives can degrade and fail causing the tension applied to the headliner to be reduced, leading to sagging or unattachment of the headliner.

Additional problems are associated with headliners of vehicles having removable roof assemblies, such as sport utility vehicles (SUVs), and convertibles. Such vehicles allow users to remove the roof from the body of the vehicle for an open-air driving experience when desired and attach the roof to the body of the vehicle when a standard enclosed, protected from the elements driving experience is necessary or desired. In such vehicles, trim panels used to hide the edges of headlines are not as easily employed given the removable nature of the roof, movements associated with removal and attachment of the roof structures to the vehicle body exert atypical forces on headliners reducing the life of the headliner and associated attachment adhesives, and the headliners are more prone to damage such as tearing and soiling given the frequent handling associated with removal and attachment of the roof structures to the vehicle body.

Thus, there exists a need for a vehicle headliner that is removably attachable to a roof structure of a vehicle and that is robust and less prone to damage, unwanted unattachment, and sagging than current headliner systems. Additionally, there exists a need for a vehicle headliner system that provides easier replacement than current headliner systems all while being low cost and be relatively simple to manufacture and convenient to install.

SUMMARY OF THE INVENTION

The present invention provides a headliner for use in a vehicle having a roof. The headliner includes a sheet having an upper surface and a lower surface. The sheet is adapted to be mounted to underlie the roof. The headliner also includes a plurality of first snap portions fixed to the sheet. Each of the plurality of first snap portions being adapted to couple with a plurality of corresponding second snap portions to mount the sheet to the roof.

The present invention also provides a vehicle headliner system that includes a headliner having a sheet with an upper surface, a lower surface, and a plurality of first snap portions fixed to the sheet and a vehicle roof structure having an exterior side and an interior side and a plurality of second snap portions fixed to the roof structure, the plurality of second snap portions adapted to couple with the plurality of first snap portions. The headliner sheet being adapted to be mounted to the interior side the vehicle roof structure through the interaction of the plurality of first snap portions and the corresponding second snap portions.

Additionally, the present invention provides a method for installing a headliner on a vehicle roof structure that includes providing a headliner comprising a sheet having an upper surface, a lower surface, and a plurality of first snap portions fixed to the sheet, and joining the plurality of first snap portions to a plurality of second snap portions fixed to the roof structure, the plurality of second snap portions adapted to couple with the plurality of first snap portions to mount the sheet to the interior side the vehicle roof structure.

BRIEF DESCRIPTION OF THE DRAWINGS

The present invention is further detailed with respect to the following drawings that are intended to show certain aspects of the present invention but should not be construed as a limit on the practice of the present invention.

FIG. 8A is a front view of an angled top hat mounting bracket according to embodiments of the present invention;

DESCRIPTION OF THE INVENTION

The present invention has utility as a vehicle headliner and a vehicle headliner system for attachment to a roof structure of a vehicle that utilizes mechanical snap fasteners to secure the headliner to a roof structure of a vehicle. The vehicle headliner is removably attachable to the roof structure of a vehicle and is robust and less prone to damage, unwanted unattachment, and sagging than current headliner systems. Additionally, the vehicle headliner system and method for installing the vehicle headliner provides easier replacement than current headliner systems all while being low cost and be relatively simple to manufacture and convenient to install.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Figure 1:
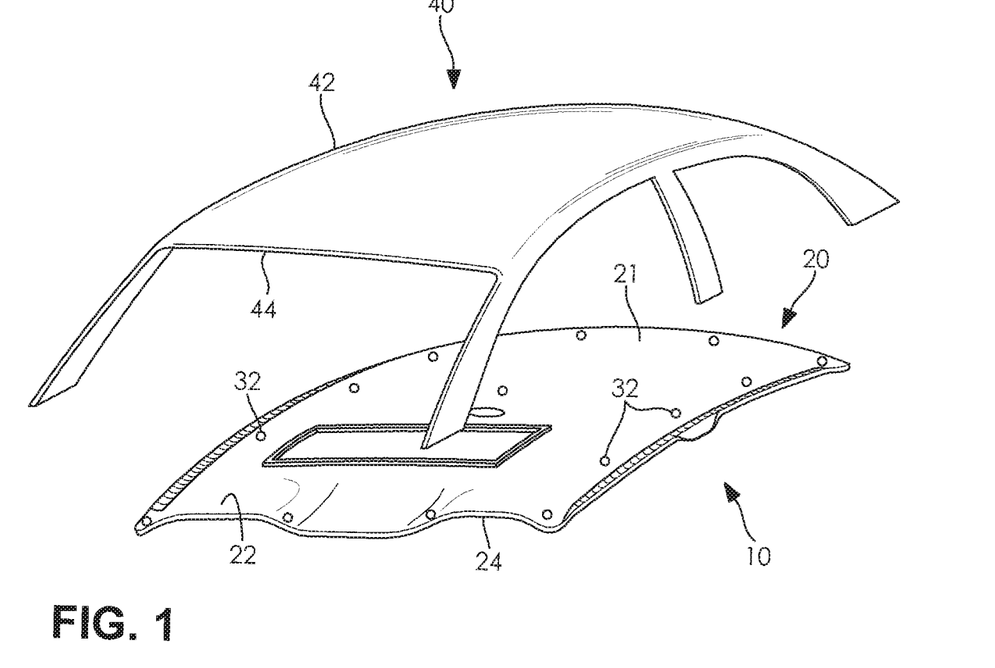
FIG. 1 is a perspective exploded view of a vehicle headliner system according to embodiments of the present invention.

As shown in FIG. 1, an inventive headliner system 10 includes an inventive headliner 20 and a vehicle roof structure 40 having an exterior surface 42 and an interior surface 44. The inventive headliner 20 is configured to be removably attached and mounted to the interior surface 44 of the vehicle roof 40 using a plurality of press fasteners 30 also referred to as snaps.

Figure 3:
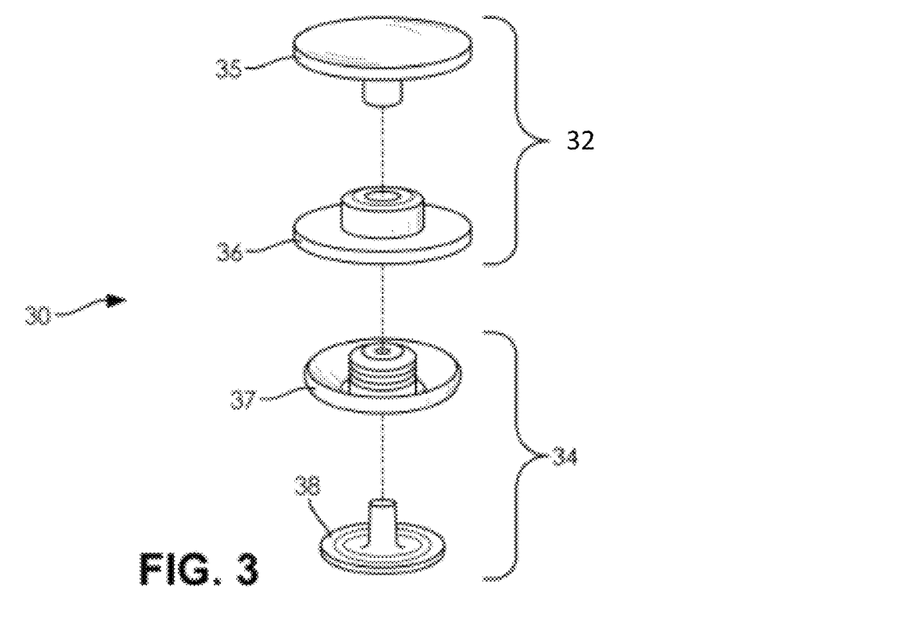
FIG. 3 is an exploded view of a press fastener according to embodiments of the present invention.
Figure 14:
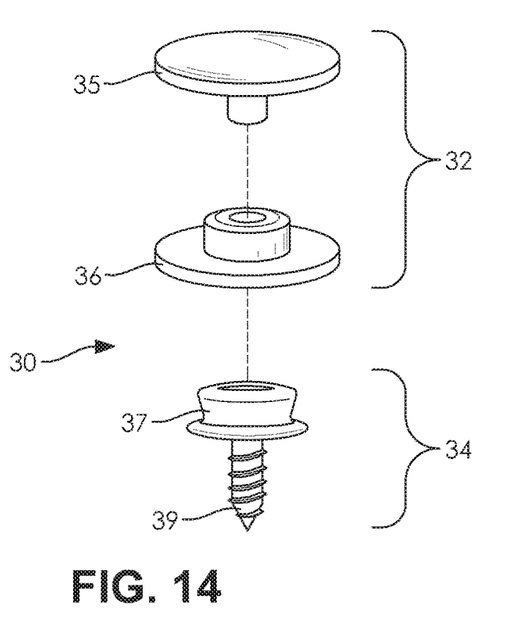
FIG. 14 is an exploded view of a press fastener according to embodiments of the present invention.
Figure 15:
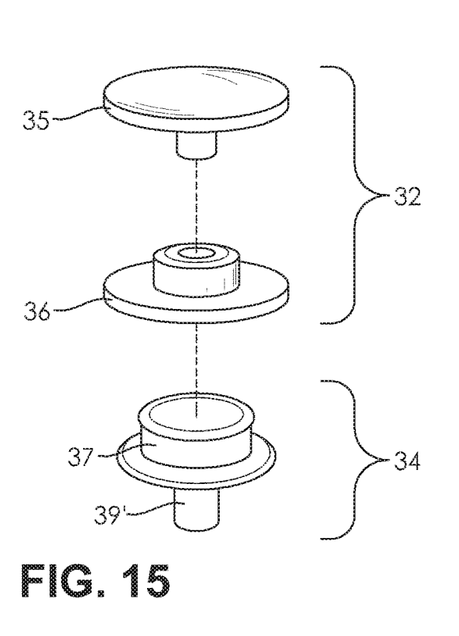
FIG. 15 is an exploded view of a press fastener according to embodiments of the present invention.

According to embodiments, each of the plurality of press fasteners 30 includes a first snap portion 32 and a second snap portion 34. As shown in FIGS. 3, 14, and 15, the first snap portion 32 of each of the plurality of press fasteners 30 includes a cap 35 and a socket 36 that are configured to be fixed together with a piece of material in between the cap 35 and the socket 36. As shown in FIG. 3, the second snap portion 34 of each of the plurality of press fasteners 30 includes a stud 37 and a post 38 that are configured to be fixed together with a piece of material in between the stud 37 and the post 38. Alternatively, as shown in FIGS. 14 and 15, the second snap portion 34 is formed of a single second snap portion piece that includes a stud portion 37 and a penetrative portion 39, 39'. As shown in FIG. 14, the penetrative portion 39 is a threaded fastener, such as a screw. As shown in FIG. 15, the penetrative portion 39' is a press rivet that is configured to expand upon compression. According to embodiments that include a singled bodied second snap portion 34 having a penetrative portion 39, 39', the second snap portion 34 is fastened to the roof structure 40 on the interior surface 44, avoiding the need for preformed through holes for mounting the second snap portions 34 to the roof structure. The first snap portion 32 and second snap portions 34 correspond to one another and are configured to be coupled together to form a releasable attachment. According to embodiments, the plurality of press fasteners 30 are formed of a thermoplastic, thermoset polymer, or a metal. According to certain inventive embodiments, the cap 35 of each of the press fasteners 30 may be stamped or embossed with a design such as a logo.

Figure 2:
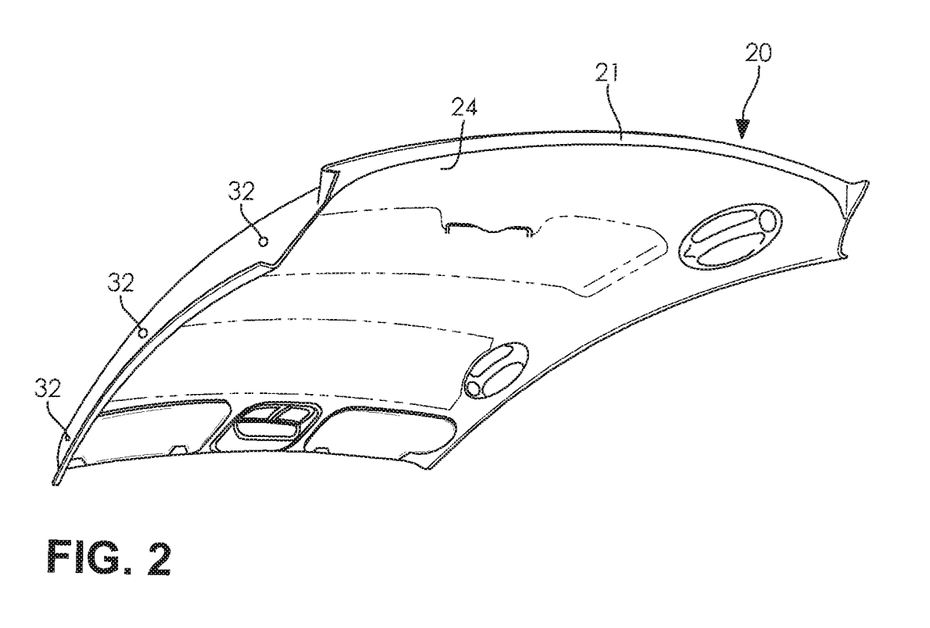
FIG. 2 is a perspective view of the lower surface of a vehicle headliner according to embodiments of the present invention.

Referring again to FIG. 1, the headliner 20 includes a sheet of material 21 adapted to be mounted to underlie the roof 40, the sheet 21 of the headliner 20 having an upper surface 22 and an oppositely opposed lower surface 24. According to embodiments, the sheet 21 of the headliner 20 is an unsupported layer of fabric such as a soft fibrous textile. According to further embodiments, the sheet 21 of the headliner 20 is a supported layer of fabric. That is, the sheet 21 is a layer of fabric such as a soft fibrous textile with a supporting backing of foam, thermoplastic, sheet molding compound, or some other material suitable for imparting stiffness and rigidity to the layer of fabric, such that the headliner is self-supporting and maintains its desired shape without folding, bending, or buckling. According to some inventive embodiments, the sheet of material 21 of the headliner 20 is formed of cloth, compression molded fiber, molded sheet molding compound (SMC), thermoplastic, or combinations thereof. According to embodiments, the sheet 21 is contoured to have a non-planar shape corresponding to a shape of the interior side of the vehicle roof structure, such that the sheet 21 conforms to contours of the interior surface 44 of the roof 40. As shown in FIGS. 1 and 2 the sheet 21, when formed of a supported layer of fabric, SMC, or thermoplastic, may be preformed to have a three-dimensional structure that is contoured to correspond to the contours of the interior surface 44 of the roof 40. Again, such inventive headliners are sufficiently stiff and rigid such that the headliner his self-supporting and maintains its desired shape and contours without folding, bending, or buckling, for example when held out at one end in an orientation that is generally parallel with the ground.

Attached to the sheet of material 21 of the headliner 20 are a plurality of halves of the plurality of press fasteners 30. As shown in FIG. 1, a plurality of first snap portions 32 are fixed to the sheet 21. Accordingly, the corresponding plurality of second snap portions 34 are provided on the interior side 44 of the roof 40 but are not visible in FIG. 1. It will be understood by those having ordinary skill in the art that the plurality of second snap portions 34 may be provided on the sheet 21 and the plurality of first snap portions 32 provided on the roof 40. The important feature of the press fasteners 30 is that the first snap portions 32 and the second snap portions correspond to one another in terms of shape, size, and location and are adapted to couple together to mount the sheet 21 to the roof 40.

Figure 4A:
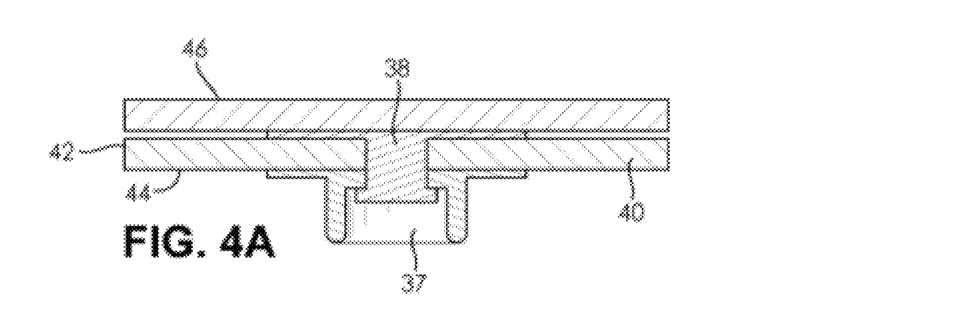
FIG. 4A is a cross sectional view of a second snap portion fixed to a roof structure according to embodiments of the present invention.
Figure 4B:
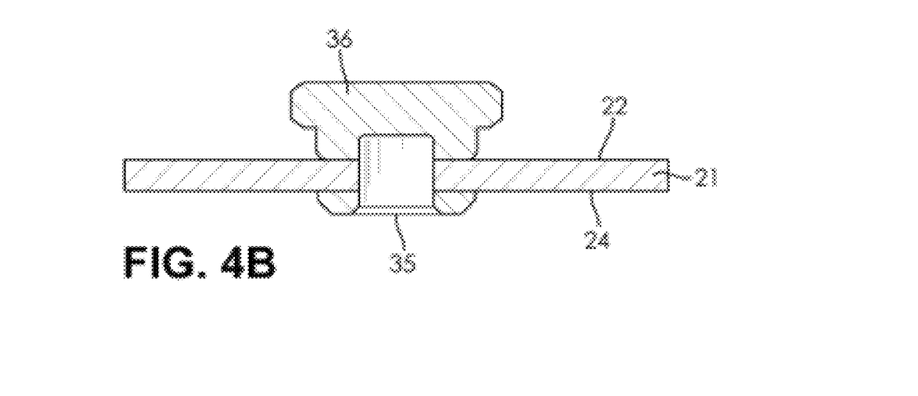
FIG. 4B is a cross sectional view of a first snap portion fixed to a sheet of a headliner according to embodiments of the present invention.

As shown in FIGS. 4A and 4B, in embodiments in which the plurality of first snap portions 32 are fixed to the sheet of material 21, the sheet 21 is positioned between the socket 36 and the cap 35 of each of the first snap portions 32 and the caps 35 and sockets 36 are fixed together with the sheet of material 21 in between them. According to embodiments, the caps 35 and sockets 36 are fixed together by riveting. The corresponding plurality of second snap portions 34 are fixed to the roof structure 40 with a portion of the roof structure 40 positioned between the stud 37 and the post 38 of each of the second snap portions 34 and the studs 37 and posts 38 are fixed together with the roof structure 40 in between them. According to embodiments, the studs 37 and posts 38 are fixed together by riveting. As shown in FIGS. 4A and 4B, the cap 35 is positioned on the lower surface of the sheet 21, the socket 36 is positioned on the upper surface of the sheet 21, the stud 37 is positioned on an interior side 44 of the roof structure 40, and the post 38 is positioned on the exterior side 42 of the roof structure 40.

Figure 5A:
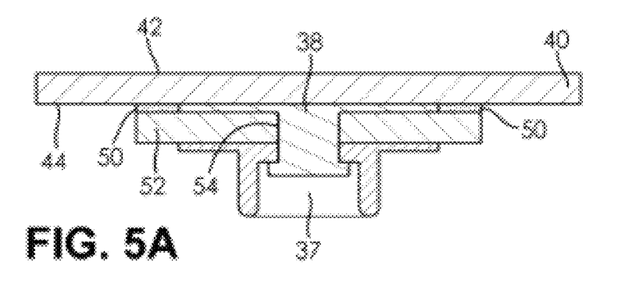
FIG. 5A is a cross sectional view of a second snap portion fixed to a roof structure according to embodiments of the present invention.
Figure 5B:
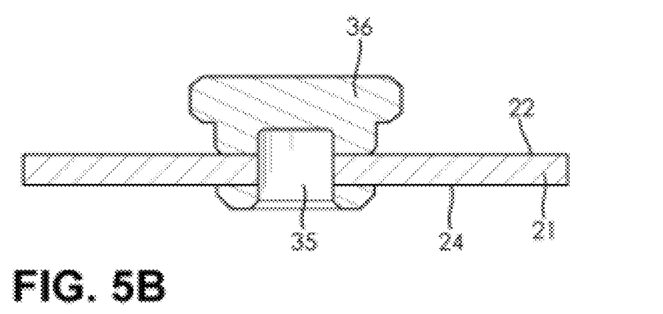
FIG. 5B is a cross sectional view of a first snap portion fixed to a sheet of a headliner according to embodiments of the present invention.
Figure 6A:
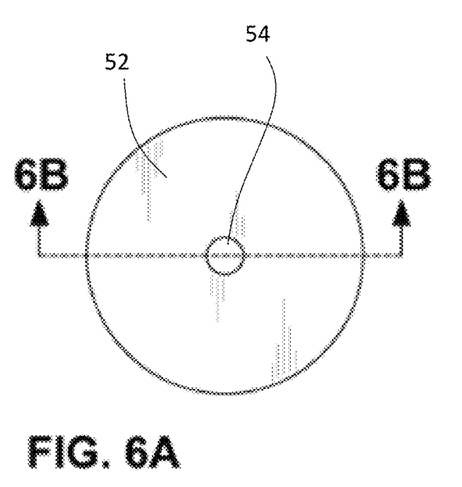
FIG. 6A is a front view of a flat mounting bracket according to embodiments of the present invention.
Figure 6B:
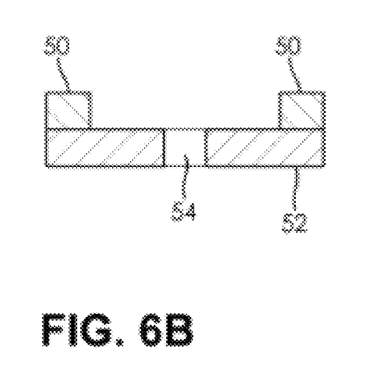
FIG. 6B is a cross sectional view of the mounting bracket of FIG. 6A.
Figure 7A:
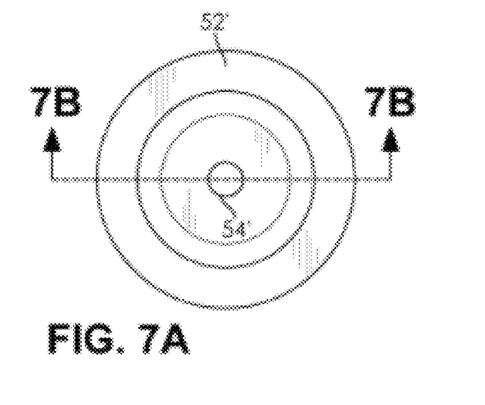
FIG. 7A is a front view of a flat mounting bracket according to embodiments of the present invention.
Figure 7B:
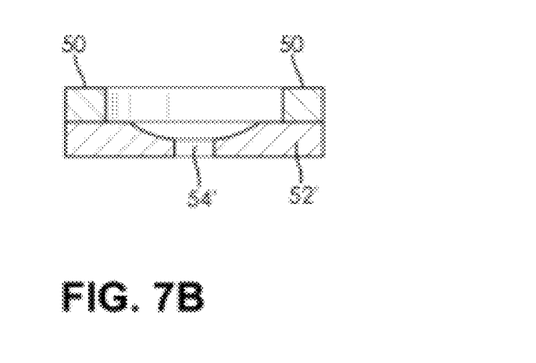
FIG. 7B is a cross sectional view of the mounting bracket of FIG. 7A.
Figure 8B:
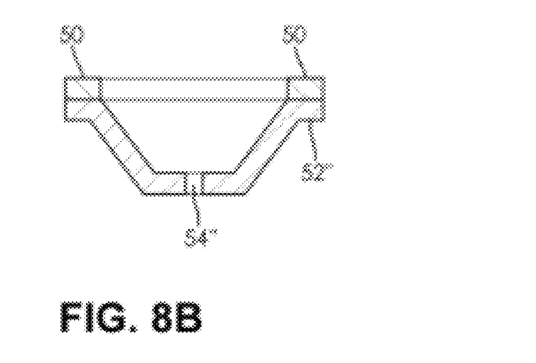
FIG. 8B is a cross sectional view of the mounting bracket of FIG. 8A.
Figures 9A, 9B:
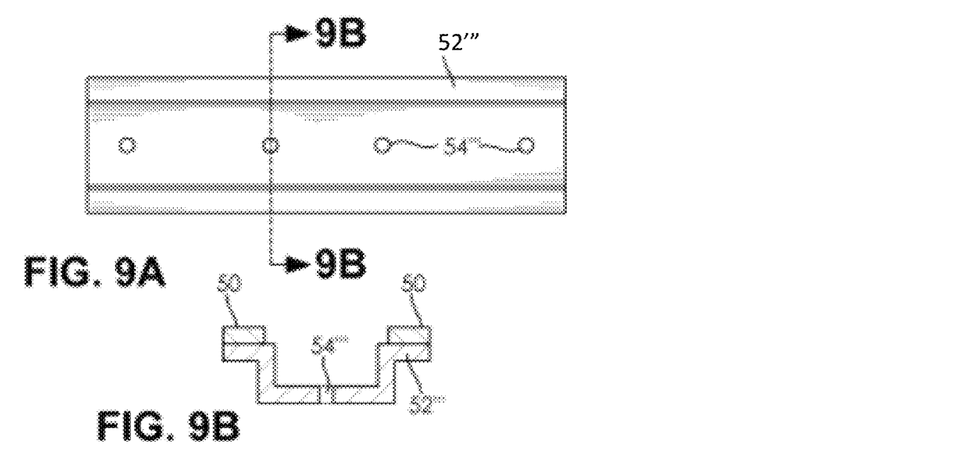
FIG. 9A is a front view of a rectangular top hat mounting bar according to embodiments of the present invention.
FIG. 9B is a cross sectional view of the mounting bar of FIG. 9A.
Figure 10A:
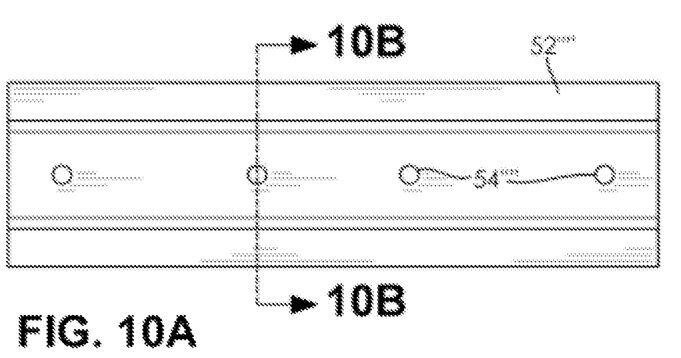
FIG. 10A is a front view of an angled top hat mounting bar according to embodiments of the present invention.
Figure 10B:
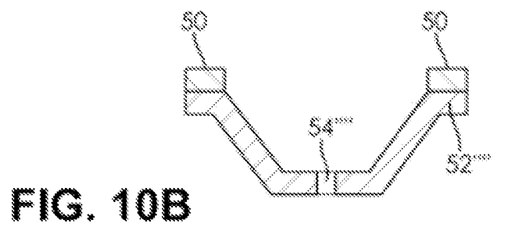
FIG. 10B is a cross sectional view of the mounting bar of FIG. 10A.

As shown in FIG. 5A, according to embodiments of the present invention the plurality of second snap portions 34 are provided on a single layer roof structure 40 by attachment to a plurality of mounting brackets 52 that are attached to the interior side 44 of the roof structure 40. Each of the plurality of mounting brackets 52 are adhesively attached to the interior side 44 of the roof structure 40 by a strong epoxy adhesive 50. As show in FIG. 5A, the post 38 and stud 37 of the second snap portion 34 are aligned at the through hole 54 and joined together through the through hole 54. That is, the post 38 is positioned on one side of the mounting bracket 52, between the interior side 44 of the roof structure 40 and the mounting bracket 52, while the stud 37 is positioned on the opposite side of the mounting bracket. As described above, the post 38 and stud 37 are riveted together. In such embodiments, a high gloss "Class A" surface finish is provided on the exterior side 42 of the roof structure, thereby further reducing the weight of the roof structure 40 as no finishing panel is necessary to cover the snap portions that would otherwise be visible on the exterior side 42 of the roof structure 40. As shown in FIG. 5A, the mounting bracket 52 is a flat circular mounting bracket 52 defining a through hole 54. As shown in FIGS. 6A-10B, the shape of the mounting brackets 52, 52', 52", 52''', 52'''' is variable according to embodiments. As shown in FIGS. 6A-6B, the mounting brackets 52 are flat with a cylindrical through hole 54. As shown in FIGS. 7A-7B, the mounting brackets 52' are flat with a conical through hole 54'. As shown in FIGS. 8A-8B, the mounting brackets 52" are top hat shaped with a cylindrical through hole 54". As shown in FIGS. 9A-9B and 10A-10B, the mounting brackets 52''', 52'''' are mounting bars that define a plurality of through holes 54''', 54''''. As shown in FIGS. 9A-9B, the mounting bar 52''' has a rectangular top hat shape, while the mounting bar 52'''' of FIGS. 10A-10B has an angled top hat shape. According to embodiments, the mounting brackets 52, 52', 52", 52''', 52'''' are formed of metal or plastic.

According to embodiments, such as shown in FIG. 4A, a finishing panel 46 is applied to the exterior surface 42 of the roof structure 40 to cover and conceal the plurality of posts 38 positioned thereon such that the posts 38 are not visible on the exterior of the vehicle. According to embodiments, the finishing panel 46 is a high gloss surface sheet formed from sheet molding compound (SMC), thermoplastic, dicyclopentadiene (DCPD), overmolded polyurethane (PU), or a combination thereof. According to embodiments, the high gloss surface sheet includes a filler material to reinforce and/or serve to decrease the weight of the high gloss surface sheet. The filler material is any of glass fibers, carbon fibers, natural fibers, hollow or solid glass microspheres, or a combination thereof. The fibers may be oriented or non-oriented. In some inventive embodiments in which SMC forms the high gloss surface, a resin package sold by Continental Structural Plastics, Inc. under the tradenames TCA® and TCA® ULTRA-LITE™ are used herein. Exemplary formulations of which are detailed in U.S. Pat. No. 7,700,670; WO2017/184761; and U.S. Pat. No. 7,524,547B2. It is appreciated that the high gloss sheet routinely includes additives to retain dimensionality. Such additives routinely including glass fiber; carbon fiber; inorganic particulate fillers such as calcium carbonate, talc, and carbon black; glass microspheres; carbon nanotubes; graphene; low profile additives; moisture scavengers; and combinations thereof. Typical thicknesses of the high gloss surface sheet in the present invention range from 0.5 to 3.5 millimeters (mm) without regard to edges. As used herein, the term "high gloss surface" refers to a surface having minimal perceptible surface defects when visually inspected for about three seconds from about 24-28 inches from the viewer and normal to the part surface +/−90 degrees in a well-lit area. That is, the term "high gloss surface" refers to a surface capable of being painted and accepted as a "Class A" autobody part. This is commonly measured by ASTM D523. In the automotive industry, a Class A surface is a surface a consumer can see without functioning the vehicle (e.g., opening the hood or decklid), while a Class A surface finish generally refers to painted outer panels and specifically to the distinctness of image (DOI) and gloss level on the part. It is appreciated that a surface layer may be subjected to sanding, trimming, and priming prior to receiving a paint coating that imparts high gloss yet must retain dimensionality and adhesion uniformity to primer and paint so as to achieve a high gloss finish.

As shown in FIG. 1, when the first snap portions 32 and the corresponding second snap portions 34 are joined together to attached the sheet 21 of the headliner 20 to the roof structure, a gap G remains between the interior side 44 of the roof structure 40 and the upper surface 22 of the sheet 21. In contrast, existing headliner systems that use adhesive to attach the headliner to the roof structure have no such gap. Thus, the benefit of the robustness of the inventive headliner system comes at a cost of lost headspace in the passenger compartment of the vehicle and required changes and new challenges to the acoustics and sound attenuation systems of the vehicle. For example, the gap G of the inventive headliner system may result in the sheet 21 oscillating during operation of the vehicle, particularly on a bumpy or uneven driving terrain that may cause uncomfortable buffeting acoustics within the vehicle passenger compartment, requiring addition sound attenuation systems or additional layers within the gap G to steady the headliner. Such problems were never faced in existing headliner systems given that no such gap has been present. While the robustness of the inventive headliner system comes at a cost and sacrifices to other vehicle systems, it has been surprisingly found that the gap G created by the snaps 30 of the present invention provides an unforeseen benefit of a dead space between the roof and the headliner that helps to regulate the temperature within the vehicle passenger compartment. That is, the gap G unexpectedly provides an insulating pocket of air that insulates the vehicle passenger compartment from the temperature extremes external to the vehicle roof 40.

Figure 11:
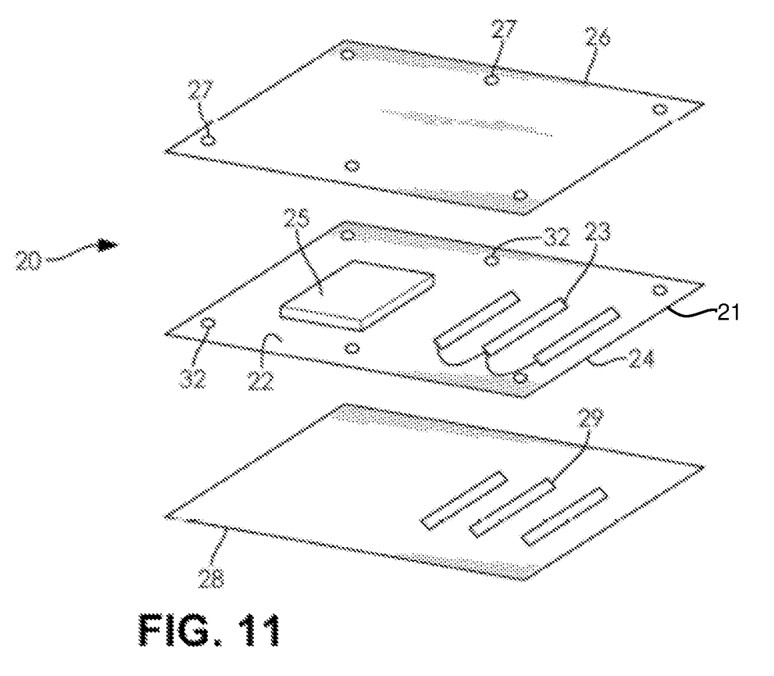
FIG. 11 is a perspective exploded view of a headliner according to embodiments of the present invention.

FIG. 11 shows an exploded perspective view of an inventive headliner 20 according to embodiments of the present invention. As shown, the sheet material 21 with a plurality of first snap portions 32 fixed thereto, as described above, is one layer of multiple layers that together make up embodiments of the inventive headliner 20. According to embodiments, the headliner 20 includes a supporting sheet 26 adhered or otherwise attached to the upper surface 22 of the sheet 21. The supporting sheet 26 provides strength and rigidity to the sheet 21. According to embodiments, the sheet 21 is sufficiently rigid and self-supporting, in such cases, a supporting sheet 26 need not be provided. According to embodiments, the supporting sheet 26 defines a plurality of through holes 27 that correspond in shape and location with the plurality of first snap portions 32 that are fixed to the sheet 21. Accordingly, the first snap portions 32 are still accessible when the upper surface 22 of the sheet 21 is covered by the supporting surface. According to embodiments, the supporting sheet 26 is planar or has a three-dimensional structure corresponding to the contours of the interior surface 44 of the roof structure 40.

According to embodiments, the headliner 20 includes a functional material 25 disposed on the upper surface 24 of the sheet 21. According to embodiments, the sheet 21 and/or the roof structure 40 includes a cavity 48 (see FIG. 12) configured to accommodate the volume of the functional material 25 and the headliner 20. According to embodiments, the functional material 25 is a phase change material, an odor absorbing material, a fire retardant or resistant material, or a combination thereof. Phase change materials operative herein include waxes or an inorganic salt hydrates. This feature can assist in regulating the temperature within the vehicle interior given that roof structures of vehicles, particularly those that are removable from the vehicle body, encounter extreme weather conditions such as sunlight, rain, ice, or snow. The phase change material assists with regulating the temperature within the vehicle when the roof structure 40 is attached to the vehicle. As noted above, according to embodiments of the headliner 20, the functional material 25 is a fire resistance material and/or a fire retardant material. A fire resistant material is one that is designed to resist burning and withstand heat and provide insulation to the substrate, while a fire-retardant material is designed to burn slowly and reduce the rate of flame spread. Intumescent fire resistant materials work by expanding their volume from 15 to 30 times and generating an ash-like char layer that erodes as fire exposure continues. Expansion then occurs again, with the number of times the process repeats itself dependent upon the thickness of the coating. Fire resistant or fire retardant materials operative herein include any of the following: silicone, casein or vinyl resins, aluminum trihydrate or antimony oxide, phosphate salt such as ammonium polyphosphate, pentaerythritol, melamine derivative, halogen, phosphorus, nitrogen, minerals, oxides, intumescent, and nanofillers, Boric acid ($H_3BO_3$) and borax ($Na_2B_4O_7.10H_2O$), Disodium octaborate tetrahydrate ($Na_2B_8O_{13}.4H_2O$), dicyandiamide-formaldehyde-phosphoric acid or melamine-dicyandiamide-formaldehyde-phosphoric acid, poly(n-vinylpyrolidone) or colloidal silica, silicon, phosphorus and nitrogen mixtures, magnesium hydroxide (MDH), monoammonium phosphate (MAP), aluminum hydroxide (ATH), and boric acid, Carbonates and hydrogen carbonates, Potassium carbonate, inorganic salts, $Na_2WO_4$, $Na_2SnO_3$, $Na_2MoO_4$, ammonium polyphosphate, pentaerythritol, melamine, and expandable graphite, and nanocomposite coatings.

According to embodiments, the sheet 21 includes electrical components 23 embedded in the sheet 21. According to embodiments, the electrical components 23 include any of lights, speakers, wires, screens, or a combination thereof. According to embodiments, the electrical components and any associated electrical supply wires are provided on the upper surface 22 of the sheet 21 but portions of the electrical components are visible on the lower surface 24 of the sheet 21 through openings provided in the sheet 21. In such embodiments, the headliner 20 includes an electrical connector that connects with a corresponding connector provided on the roof structure that ultimately connects to the electrical power supply of the vehicle.

According to embodiments, a decorative sheet 28 is adhered or otherwise attached to the lower surface 24 of the sheet 21. The decorative sheet 28 is provided to cover the sheet 21 and shield the sheet 21 from view when viewed from within the vehicle passenger compartment. According to embodiments, the decorative sheet 28 is a layer of fabric that is aesthetically pleasing. According to embodiments, the decorative sheet 28 covers the caps 35 of the first snap portions 32 that would otherwise be visible on the lower surface 24 of the sheet 21. According to embodiments, the decorative sheet 28 defines at least one through hole 29 therein through which portions of the sheet 21 or various components embedded in the sheet 21 are visible. For example, as shown in FIG. 11, the decorative sheet 28 includes three openings 29 that correspond in shape and location to the three lighting elements 23 embedded in the sheet 21.

Figure 12:
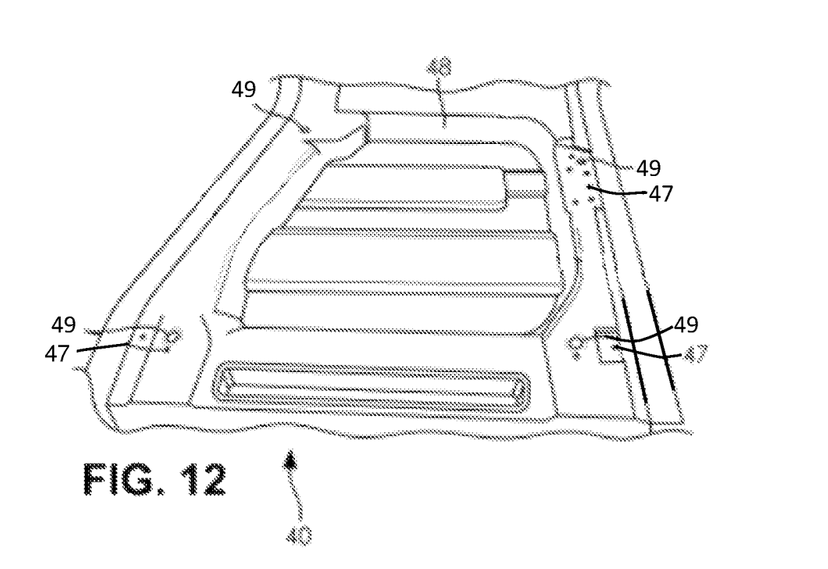
FIG. 12 is a bottom perspective view of vehicle roof structure according to embodiments of the present invention.
Figure 13A:
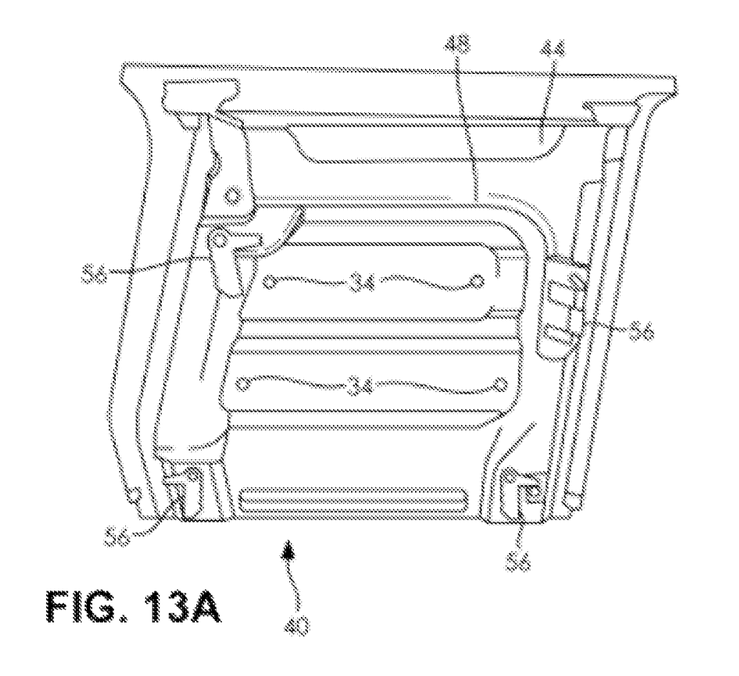
FIG. 13A is a bottom perspective view of a portion of a vehicle roof structure according to embodiments of the present invention.
Figure 13B:
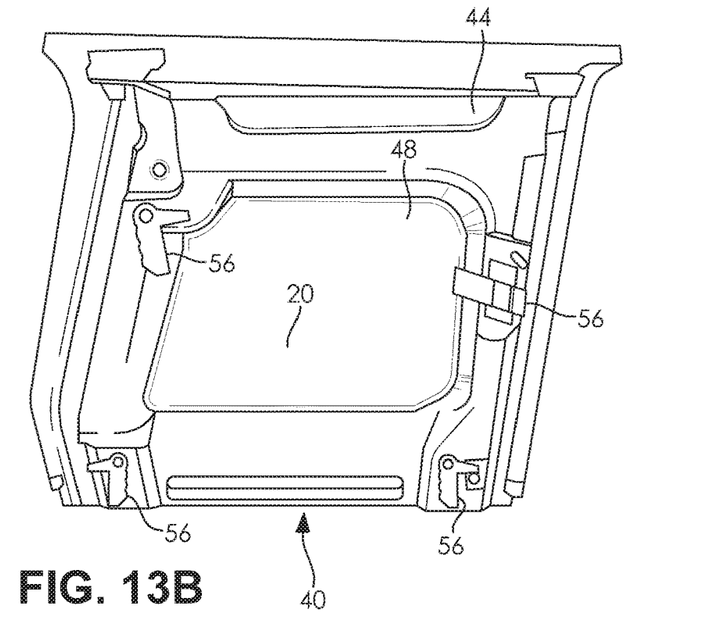
FIG. 13B is a bottom perspective view of the vehicle roof structure portion of FIG. 13A with an inventive headliner section mounted thereon according to embodiments of the present invention.

FIG. 12 shows a vehicle roof structure 40 according to embodiments of the present invention. As shown in FIG. 12, the vehicle roof structure 40 is contoured. Such contours may be used to accommodate other vehicle components, other components of the headliner 20, and/or to form structural beams and/or safety features of the roof 40 of the vehicle. As shown in FIG. 12, embodiments of the roof structure 40 include a cavity 48 that accommodates portions of the headliner 20, such as the functional material 25 or electrical components 23 provided in embodiments of the inventive headliner 20. Additionally, as shown in FIG. 12, embodiments of the roof structure 40 include through holes 49 defined within the structure of the roof 40 at various predefined locations. Such through holes 49 provide attachment points for the plurality of second snap portions 34 of the plurality of press fasteners 30. That is, each post 38 of the plurality of second snap portions 34 is provided on the exterior side 42 of the roof structure 40 at each of the through holes 49, each of the plurality of studs 37 of the plurality of second snap portions 34 are provided on the interior side 44 of the roof structure 40 at each of the through holes 49, and the studs 37 are then riveted to the posts 38 through the through holes 49 defined in the roof structure 40. In some inventive embodiments, additional holes 47 are provided that are provided for other vehicle components such as drains or for mounting a plurality of roof securing levers 56, as shown in FIGS. 13A and 13B. FIG. 13A shows a portion of a roof structure 40 that is removable from the remainder of the roof structure. As shown, a plurality of rotatable levers 56 are provided on the interior surface 44 of the roof structure 40 for locking the removable section of the roof 40 to the rest of the roof structure. Additionally, FIG. 13A shows a plurality of second snap portions 34 installed in the roof structure 40 within the headliner 20 receiving cavity 48 of the roof structure 40. FIG. 13B shows the same removable roof portion 40 as in FIG. 13A, but in FIG. 13B a portion on headliner 20 is installed within the cavity 48 of the roof structure 40.

According to embodiments, the roof structure 40 is formed of metal, reinforced sheet molding compound (SMC), epoxy, acrylonitrile butadiene styrene (ABS), polycarbonate, or random-oriented fiber reinforced thermoplastic resin (FRTP). Sheet molding compound (SMC) or sheet molding composite is a ready to mold fiber-reinforced polyester material primarily used in compression molding. SMC is a reinforced composite material that is manufactured by dispersing long strands (>1") of chopped glass fibers in a bath of polyester resin. Thermoplastic materials referred to herein include but are not limited to poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, and block copolymers of any one of the aforementioned. Reinforcing fibers and fillers operative herein illustratively include carbon fibers, glass fibers, aramid fibers, cellulosic fibers, or a combination thereof. In some inventive embodiments, the chopped fiber is glass fiber, alone or in combination with other types of fiber or reinforcing fillers. According to embodiments, the roof structure 40 is formed of glass fiber reinforced SMC.

In light of the above disclosure, one having ordinary skill in the art will recognize the benefits provided by the embodiments of the inventive headliner 20 and vehicle headliner system. Without limitation, the benefits provided by embodiments of the inventive headliner 20 and vehicle headliner system include a headliner system that does not require adhesives to be mounted to the roof structure. As described above, such adhesives degrade and fail causing the tension applied to the headliner to be reduced, leading to sagging or unattachment of the headliner that is unattractive and obstructive of a driver's view. Given the robust nature of the press fasteners employed in embodiments of the present invention and the lack of adhesives, the present invention provides the benefits of a headliner that is less likely to sag or become undesirably attached from the roof structure. Additionally, given the releasable nature of the press fasteners employed, the headliner of the vehicle headliner system is easily installable, removable, and replaceable. This provides the ability to easily replace a soiled headliner in order to clean up a car, for example before resale of the vehicle. Additionally, the removability and replaceability of the headliner allows for customization and personalization of a vehicle, for example by providing headliners with various decorative prints (e.g. striped, leopard, plaid, gingham, houndstooth, paisley, Battenberg lace), with various electrical components (e.g. optional screens, lighting feature, speaker systems etc.), and with various functional fabrics (e.g. a winter liner made of wool, fleece, or flannel, etc.).

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A removable and replaceable headliner for use in a vehicle having a roof, the headliner comprising:
    a sheet adapted to be removably mounted to underlie the roof, the sheet having an upper surface and a lower surface;
    a plurality of first snap portions, each of the first snap portions comprising a cap and a socket, the cap being a male half of a press fastener and the socket being a female half of a press fastener, the cap and socket fixed together with the sheet in between the cap and socket, the plurality of first snap portions adapted to releasably couple with a plurality of corresponding second snap portions to mount the sheet to the roof; and
    a plurality of mounting brackets that are attached to an interior side of the roof, the plurality of the second snap portions attached to the plurality of mounting brackets or directly to the interior side of the roof.

2. The headliner of claim 1 wherein the plurality of second snap portions are fixed to the roof.

3. The headliner of claim 1 wherein the plurality of second snap portions each comprise a stud and post.

4. The headliner of claim 1 wherein each the plurality of first snap portions are fixed to the sheet by a rivet attachment.

5. The headliner of claim 1 wherein the sheet is rigid.

6. The headliner of claim 1 wherein the sheet is formed of molded sheet molding compound (SMC) or thermoplastic.

7. The headliner of claim 1 wherein the sheet conforms to contours of the roof.

8. The headliner of claim 1 further comprising a phase change material disposed on the upper surface of the sheet.

9. The headliner of claim 1 further comprising electrical components embedded in the sheet.

10. The headliner of claim 1 further comprising a decorative layer disposed on the lower surface of the sheet.

11. A vehicle removable and replaceable headliner system comprising:
 a vehicle roof structure having an exterior side and an interior side;
 a headliner comprising a sheet adapted to be removably mounted to the interior side the vehicle roof structure, the sheet having an upper surface and a lower surface;
 a plurality of first snap portions, each of the first snap portions comprising a cap and a socket, the cap being a male half of a press fastener and the socket being a female half of a press fastener, the cap and socket fixed together with the sheet in between the cap and socket;
 a plurality of second snap portions fixed to the roof structure, the plurality of second snap portions adapted to releasably couple with the plurality of first snap portions to mount the sheet to the interior side the vehicle roof structure; and
 a plurality of mounting brackets that are attached to an interior side of the vehicle roof structure, the plurality of the second snap portions attached to the plurality of mounting brackets or directly to the interior side of the roof.

12. The vehicle headliner system of claim 11 wherein the vehicle roof structure is removable from the vehicle.

13. The vehicle headliner system of claim 11 wherein the vehicle roof structure is formed of reinforced sheet molding compound (SMC).

14. The vehicle headliner system of claim 11 wherein the sheet is rigid.

15. The vehicle headliner system of claim 11 wherein the sheet is contoured to have a non-planar shape corresponding to a shape of the interior side of the vehicle roof structure.

16. A method for removably installing a headliner on a vehicle roof structure, the method comprising:
 providing a headliner comprising a sheet having an upper surface, a lower surface;
 providing a plurality of first snap portions, each of the first snap portions comprising a cap and a socket, the cap being a male half of a press fastener and the socket being a female half of a press fastener, the cap and socket fixed together with the sheet in between the cap and socket; and
 joining the plurality of first snap portions to a plurality of second snap portions, the plurality of second snap portions directly fixed to the roof structure or via a plurality of mounting brackets that are attached to an interior side of the vehicle roof, the plurality of second snap portions adapted to releasably couple with the plurality of first snap portions to removably mount the sheet to the interior side the vehicle roof structure.

17. The method of claim 16 further comprising first removing an existing headliner from the vehicle roof structure to reveal the plurality of second snap portions fixed to the roof structure.

* * * * *